May 17, 1960
A. W. POPE, JR., ET AL
2,936,609
ART OF KNOCK-RATING GASOLINES UNDER
SUPERCHARGED OPERATING CONDITIONS
Filed Nov. 20, 1957
3 Sheets-Sheet 1
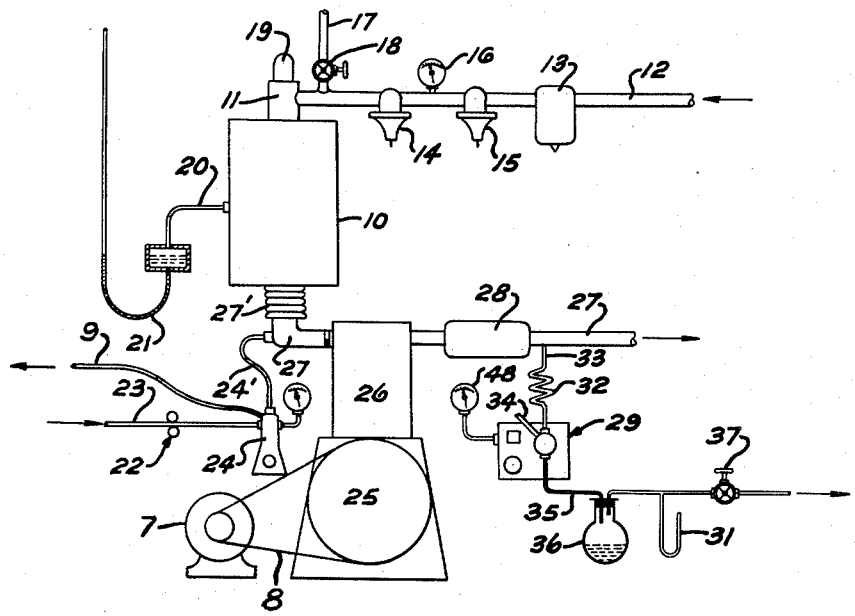
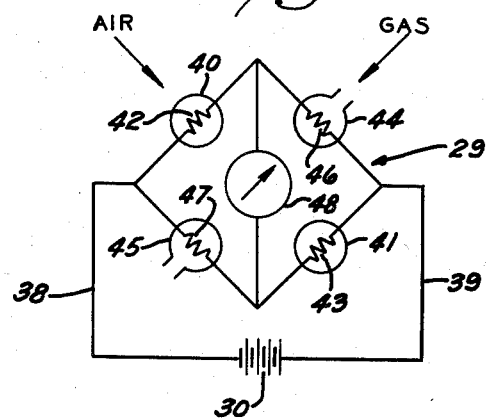
INVENTORS
Arthur W. Pope Jr.
BY Ivan Baxter
Morrell & Morrell
ATTORNEYS.

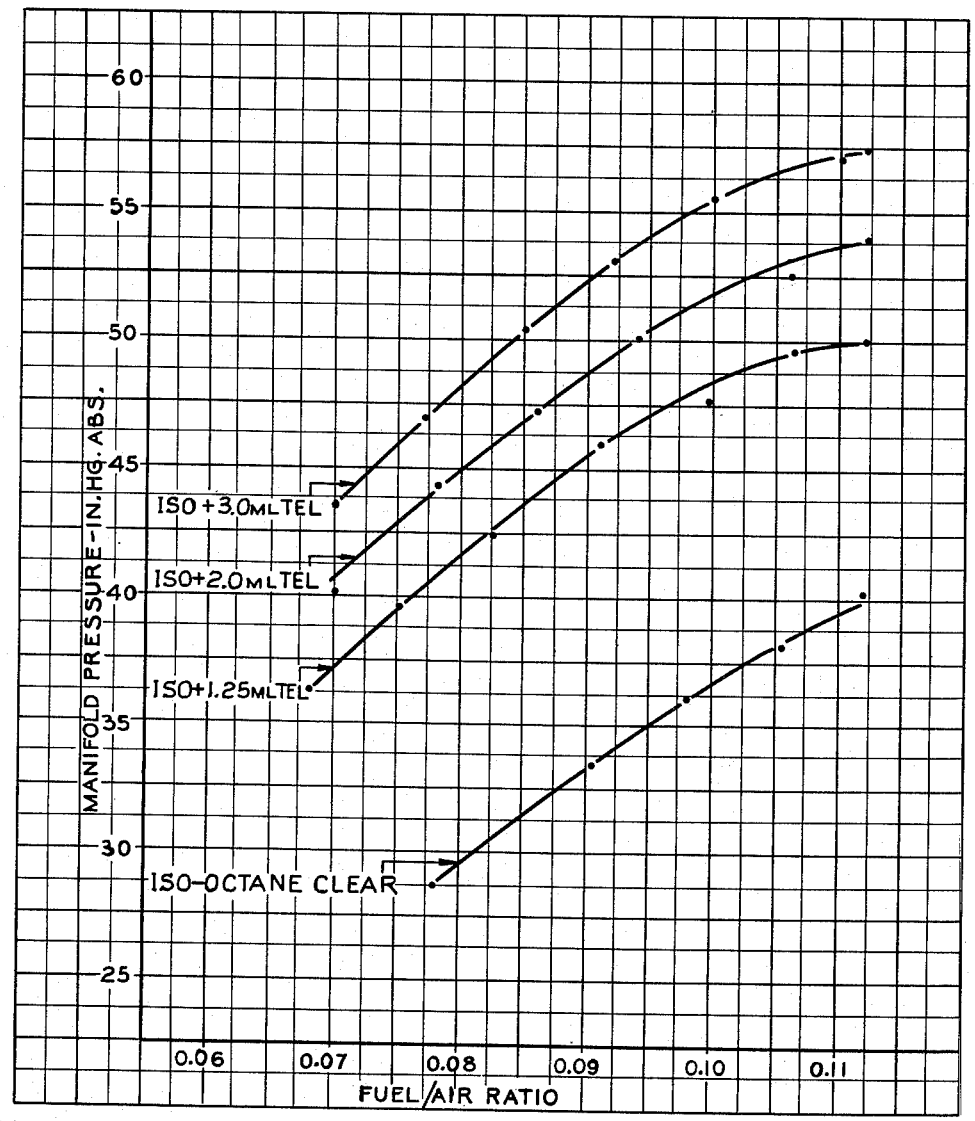

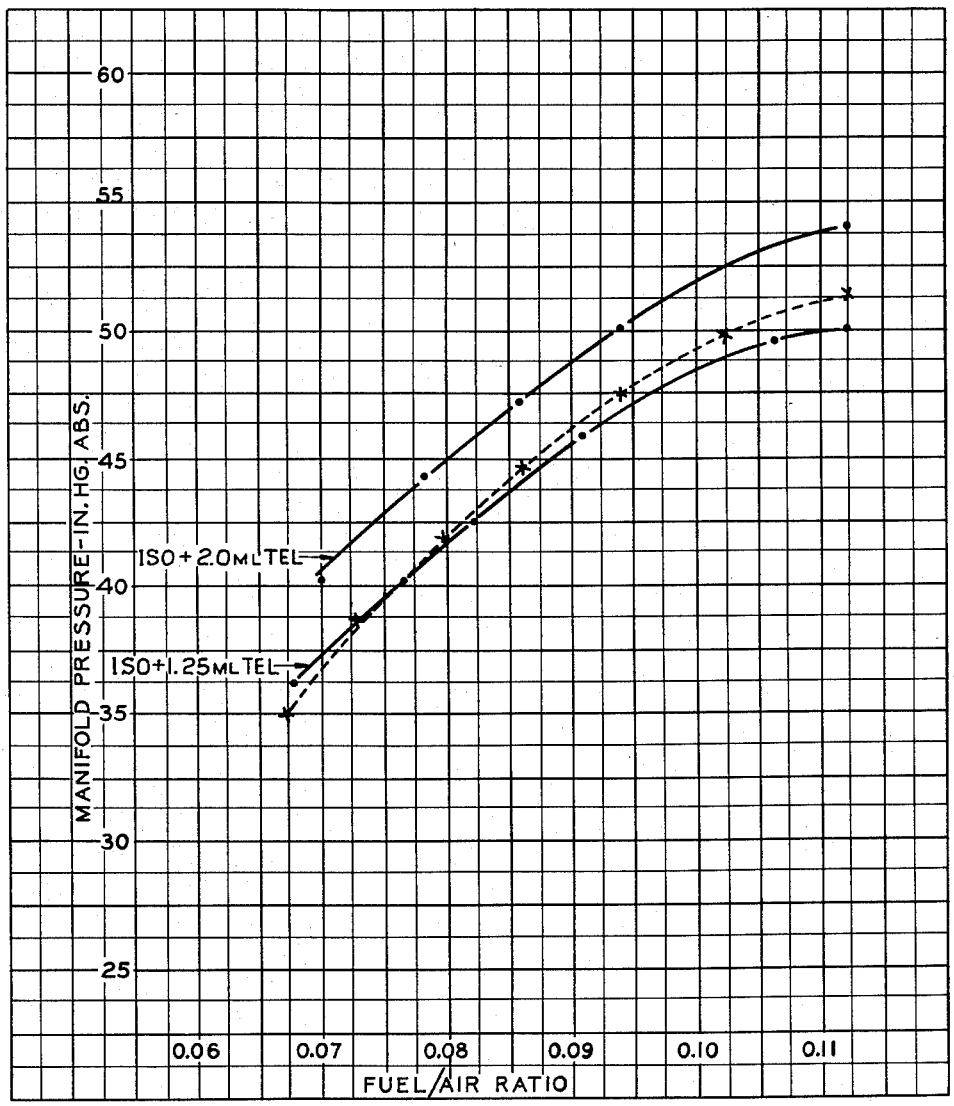

2,936,609
Patented May 17, 1960

2,936,609

ART OF KNOCK-RATING GASOLINES UNDER SUPERCHARGED OPERATING CONDITIONS

Arthur W. Pope, Jr., Waukesha, and Ivan Baxter, Hartland, Wis., assignors to Waukesha Motor Company, Waukesha, Wis., a corporation of Wisconsin Application November 20, 1957, Serial No. 697,660

2 Claims. (Cl. 73—35)

This invention relates to improvements in the art of knock-rating gasolines under supercharged operating conditions.

Heretofore the knock-limited power of fuels for use in spark-ignition aircraft engines has been determined on a supercharged test engine with the use of an airflow meter, a fuel-weighing device, and a dynamometer for power measurement. This equipment, and particularly the dynamometer is cumbersome and bulky and therefore cannot be satisfactorily employed where available space is limited such as in mobile laboratories. With test apparatus as heretofore used, a fuel weighing device has been employed to indicate the fuel flow rate and the dynamometer scale has been calibrated to give a direct reading of the engine-indicated mean effective pressure.

It is the characteristic of a fuel to knock less as the fuel/air mixture ratio is enriched beyond the maximum power ratio. The method of knock-rating gasoline with prior equipment consists in determining the maximum engine output at which audible knock occurs over the fuel/air ratio range from .08 to .12. These values are plotted with fuel/air ratio as the abscissa and indicated M.E.P. (mean effective pressure) as the ordinate. The knock-limited curve for the gasoline being tested is established first, and then standard reference fuels are run which will fall both above and below the test fuel on the chart. A reference fuel which would exactly match the sample under test at the peak of the reference fuel curve is then calculated by interpolation and the knock-rating of the fuel being tested is reported as that of the matching reference fuel.

It is a general object of the present invention to provide improvements in the art of knock-rating gasolines which does not rely on direct air, fuel and power measurement to indicate when the engine is operating at the desired fuel/air ratio.

A more specific object of the invention is to provide a method and apparatus for the purpose above described which eliminates the necessity of utilizing a cumbersome dynamometer, whereby the apparatus can be installed in mobile laboratories such as those used by the military.

A more specific object of the invention is to provide a test method and apparatus of the class above described which makes use of manifold pressure as a substitute for engine indicated means effective pressure to eliminate the need of a power measuring dynamometer and accompanying scales, and which employs an exhaust gas analyzer of the thermal-conductivity type in lieu of the airflow meter and fuel weighing equipment heretofore used.

A further object of the invention is to provide a method for the purpose described wherein an exhaust gas analyzer is employed in a novel manner.

A further object of the invention is to provide an improved supercharged knock test method for gasoline wherein manifold pressure and exhaust gas analyses are used to indicate power and fuel rate, in order to establish knock limited rating curves on the basis of percentage of combustibles in the exhaust gas.

A further object of the invention is to provide as one species of the invention, a method as above described wherein manifold pressure and exhaust gas analyses are used to indicate power and fuel-rate for establishing knock-limited rating curves on the basis of fuel/air ratio, which method is suitable for use in connection with fuels which are relatively similar to one another, such as aviation fuels.

A further object of the invention is to provide novel apparatus for affecting commercial exploitation of the improved method.

Other objects of the invention are to provide apparatus of the class described which is compact, lighter in weight, less expensive than prior apparatus, relatively foolproof, and which requires less time to use.

With the above and other objects in view, the invention consists of the improvements in the art of knock-rating gasolines under supercharged operating conditions, and all of the steps, parts and combinations as set forth in the claims, and all equivalents thereof.

In the accompanying drawings, illustrating one complete embodiment of apparatus which it is preferred to use in carrying out the improved method:

Fig. 1 is a diagrammatic view of the apparatus;

Fig. 2 is a diagrammatic view showing the electrical circuit for the analysis cell block of the exhaust gas analyzer;

Fig. 3 is a view showing a reference fuel framework for use with the improved method; and Fig. 4 is a view showing comparative results between a test sample and standard reference fuels.

Referring more particularly to Fig. 1 of the drawing, the numeral 10 designates an insulated surge tank having a top fitting 11 for receiving shop compressed air from a line 12, the compressed air being from any suitable source. In the line 12 is an air line filter 13. Pressure reducing valves 14 and 15 in series are also used to insure steady supercharged pressures in the surge tank, there being a pressure gauge 16 in line 12 between the valves 14 and 15. A branch line 17 leading to the atmosphere is under control of an atmospheric valve 18. Communicating with the top of the fitting 11 is a mixture heater 19, for heating the intake air. A conduit 20 leading from a side of the surge tank connects with a boost manometer 21.

A supply pump 22 draws fuel through a conduit 23 leading from a suitable source of supply. The line 23 connects with an injection pump 24, the latter being suitably driven from the cam shaft of the engine 25. A return line 9 leading from the injection pump 24 back to the source of supply, keeps the pump supply gallery scavenged of foam and vapor. The injection pump 24 is connected by a conduit 24' with a supercharged intake elbow 27. One end of the intake elbow is connected with the bottom of the surge tank 10 by a bellows 27' and the other end is connected with the cylinder 26 of the engine 25 in the customary manner, the engine having the usual exhaust pipe 27 with interposed surge tank 28. The engine is a single cylinder test engine. This engine has a variable compression ratio cylinder and is belt-connected as at 8 to a two-speed induction motor 7 for power absorption and speed control which will maintain the engine at either 600 or 900 r.p.m.

Connected to the exhaust pipe is an Engelhard type A–7 exhaust gas analyzer 29 which is preferably operated from a 12 volt battery 30, and is calibrated to give a reading from 0.066 to at least 0.115 fuel-air ratio, and preferably up to .12. Inasmuch as it is important to maintain a steady rate of exhaust gas flow through the analysis cells of the analyzer 29, a water aspirator is employed to draw the exhaust gas through the analysis cells under two inches of water pressure below atmospheric as shown by a water manometer 31. In order to cool the exhaust gases to approximately the temperature of the surounding atmosphere a copper cooling coil 33 is employed to lead the exhaust gases from the exhaust pipe 27 into the analyzer 29. In lieu of the cooling coil 32 a long length of tubing 33 may be used. Atmospheric air enters the analyzer 29 through a saturating plug 34. This plug is screwed into the cell block to insure saturation of the air and it contains an inserted wick which is saturated with water. The saturating plug 34 has a small vent hole to the atmosphere.

In the discharge line 35 is a condensate trap 36 to prevent slugs of condensate from interferring with steady gas flow. Valve 37 controls the flow. The pipe 35 leads to any suitable source of vacuum.

The gas analyzer 29 is of a type normally used on aircraft to determine the fuel/air mixture as supplied by the carbureter and operates on changes in the composition of the exhaust gases to give a visual indication of those mixtures. The present use for such an analyzer is an unobvious type of use, as will become apparent hereafter.

The gas analyzer 29 includes a block of analysis cells as shown diagrammatically in Fig. 2, which are connected in a Wheatstone bridge circuit. As shown in Fig. 2, wires 38 and 39 from the battery 30 extend to the bridge. The bridge circuit includes oppositely disposed air cells 40 and 41 having platinum spirals forming resistors 42 and 43. These are in the path of the flow of atmospheric air admitted through the saturation plug 34 of Fig. 1 and flowing as indicated diagrammatically by the airflow arrow in Fig. 2. The bridge also includes gas analysis cells 44 and 45 containing platinum spirals 46 and 47. All four spirals are matched. The spirals 44 and 45 are in the path of exhaust gas flow from the tube 33 as is also indicated diagrammatically in Fig. 2.

The four gas sensitive elements 42, 43, 46 and 47 are of equal electrical resistance and, being made of platinum, as the temperature changes, the electrical resistance also changes. With the elements 46 and 47 exposed to the exhaust gas from the exhaust pipe 27, the engine operating on a rich mixture, and with the elements 42 and 43 exposed to air, the Wheatstone bridge of Fig. 2 will be unbalanced. A current will flow through the indicator 48 which has been calibrated to give a fuel/air reading. The unbalanced condition of the Wheatstone bridge is caused by hydrogen in the exhaust gas which serves to decrease the temperature and electrical resistance of the elements 46 and 47 as compared with the elements 42 and 43 which are exposed to air, the thermal conductivity of hydrogen being greater than that of air so that more heat is carried away from the elements which are surrounded by hydrogen than from those which are surrounded by air.

Ordinarily, exhaust gas analyzers are considered to be an unreliable method of indicating fuel/air ratio. This is because interest in exhaust gas analysis is usually associated with fuel/air ratio on the lean side of the maximum power range, on which side the analyzer becomes erratic and eventually inoperative as the mixture becomes too lean. The basic principle of the analyzer prevents it from operating effectively in the lean mixture range. This is due primarily to the fact that the operation of the instrument depends primarily on the amount of unburned hydrogen remaining in the exhaust gas. Hydrogen has a thermal-conductivity about seven times that of nitrogen. Therefore, small changes in hydrogen percent provide measurable differences in the thermal-conductivity of the exhaust gas which are readily converted, through a reading on the meter 48 which therefore indicates differences in current flow on the two sides of the Wheatstone bridge of Fig. 2 caused by the different effect of the exhaust gases and atmospheric air on the cells of Fig. 2. Since appreciable quantities of hydrogen are present in an exhaust gas with rich mixtures and become completely absent in lean mixtures, the analyzer 29 is very positive and reliable in the rich range but practically inoperative in the lean range where it has been customarily used in the adjustment of carburetors.

The present use is therefore an unusual one for an exhaust gas analyzer but the latter works exceptionally well in the present application for a supercharged knock test rating where the fuel/air ratio is in the extreme rich range because it is here where the analyzer has good reliability.

The fuel/air ratio scale on the analyzer as illustrated holds good only for fuels which are of the same general type. However, for practical purposes, commercial aviation gasolines are sufficiently similar to one another that the method of the present invention can be used. The invention, however, has a broader application and may be used for testing unconventional fuels, as will be hereinafter explained.

In carrying out a test on aviation fuel with the improved method and apparatus of the present invention, a framework sheet such as shown in Fig. 3 is employed which is printed with knock-limited curves for standard reference fuels. In Fig. 3, the lowermost curve is iso-octane clear, the next curve is for iso-octane plus 1.25 ml. tetraethyl lead, the next curve iso-octane plus 2.0 ml. tetraethyl lead, and the uppermost curve is iso-octane plus 3.0 ml. tetraethyl lead. One side of the chart shows manifold pressure and the other side shows fuel/air ratio as determined by the exhaust gas analyzer 29. The curves show knock-limited performance at standard operating conditions. The figures represent milliliters of tetraethyl lead per U.S. gallon.

A sample of gasoline to be tested is run on the engine 25 of Fig. 1. The method of knock-rating the gasoline consists of determining the maximum engine output at which audible knock, determined by ear or by a detonation meter, occurs over a predetermined fuel/air ratio range such as a range of from .08 to .115. This is done at constant compression ratio by varying the manifold pressure and the fuel flow rate, while the engine is running under suitably standardized operating conditions. Manifold pressure, as indicated by the boost manometer 21 together with fuel/air ratio as obtained by exhaust gas analysis through the analyzer 29 are plotted on a framework sheet at each of several arbitrary points over the predetermined fuel/air ratio range, as indicated by the broken line in Fig. 4. This is done at enough points as indicated by the X's in Fig. 4, to define the mixture response curves for the sample fuel. When manifold pressure is used as the index the curve will continue to rise in the extreme rich range as shown in Fig. 4, since manifold pressure can be raised even though the power falls off due to poor combustion from over-richness. Since these curves do not peak the ratings are made at a definite fuel/air ratio and it is convenient to use 0.11, which figure corresponds with the peak of the standard American Society for Testing Materials Reference Fuel Framework. After the knock-limited curve for the gasoline under test has been established by reference to the framework, standard reference fuels are run on the test engine which fuels will fall above and below the test fuel. Then the knock-limited power for the sample as shown by the broken line in Fig. 4 is bracketed between those of two adjacent reference fuels, as indicated by the solid lines in Fig. 4. A reference fuel which would exactly match the sample under test at the peak of the reference fuel curve is then calculated by interpolation and the knock-rating of the test fuel is reported as that of the matching reference fuel. Thus, the sample shown by the broken lines in Fig. 4 is rated at iso plus 1.56 milliliters of tetraethyl lead per gallon.

While fuel/air ratio is a reliable index for the percentage of over enrichment for fuels of similar types such as conventional aviation gasolines, it is not a reliable index for percentage of over enrichment for fuels of different types. Therefore the calibration of the meter scale 48 in terms of fuel/air ratio applies only to conventional type aviation gasolines. For conventional gasolines the exhaust analysis method will agree with ASTM (American Society for Testing Materials) direct fuel/air measurement method. For fuels requiring different fuel/air ratio than conventional fuel for the same percent of over enrichment, the ratings by the two methods will differ.

This is because the ASTM constant fuel/air method may rate a fuel at a mixture leaner than is required to obtain the full supercharged knock-limited power from that fuel. The exhaust analysis method of the present invention can rate all fuels at a constant percentage of exhaust combustibles selected to give maximum supercharged knock-limited power, no matter whether the meter scale 48 is marked in fuel/air units or to show percent of combustibles and the scale 48 may be marked in the latter manner if desired when it is to be used for unconventional gasolines.

In summary, therefore, the exhaust gas analysis method will give supercharged knock-limited ratings related to fuel/air ratio only for gasolines of the same type, but will give ratings based on percent of exhaust combustibles for fuels of all types.

Therefore, the broadest aspect of the present invention consists of the use of manifold pressure and exhaust gas analysis to indicate power and fuel rate for establishing knock-limited rating curves on the basis of percentage of combustibles in the exhaust gas, whereas a more limited aspect of the invention suitable for use with aviation fuels which are generally similar is to establish the knock-limited rating curves on the basis of air/fuel ratio, as shown in the examplts of Figs. 3 and 4.

It is to be understood that the present invention is not limited to the exact details of the apparatus shown and described or to the precise steps of the method, for obvious modifications will occur to persons skilled in the art.

What we claim is:

1. A method of knock-rating gasoline under supercharged operating conditions comprising running a sample on a test engine, adjusting the manifold pressure and mixture control until standard knock intensity is obtained at each of several arbitrary points in a predetermined fuel/air ratio range, recording the manifold pressure at each of said points, analyzing the exhaust gas to determine the fuel/air ratio at each of said points, repeating the foregoing steps on at least one reference fuel and recording the corresponding results for comparison with said samples whereby a knock rating of said sample at selected points in said range may be obtained in terms of reference fuel characteristics.

2. A method of knock-rating gasoline under supercharged operating conditions comprising running a sample on a test engine, adjusting the manifold pressure and mixture control until standard knock intensity is obtained at each of several arbitrary points in a predetermined fuel/air ratio range, recording the manifold pressure at each of said points, analyzing the exhaust gas to determine the fuel/air ratio at each of said points, plotting said pressures and fuel/air ratios on a graph, repeating the foregoing steps on at least two reference fuels and recording the corresponding results for comparison with said samples whereby a knock rating of said sample at selected points in said range may be obtained by interpolation in terms of reference fuel characteristics.

References Cited in the file of this patent

UNITED STATES PATENTS

| | | |
|---|---|---|
| 2,130,900 | Presbrey | Sept. 20, 1938 |
| 2,591,759 | Zaikowsky | Apr. 8, 1952 |

OTHER REFERENCES

Publication: National Bureau of Standards, Technical News Bulletin, vol. 37, No. 8, August 1953, pages 113–115.